J. R. GATES.
Rotary Winnower.
No. 17,325.
Patented May 19, 1857.
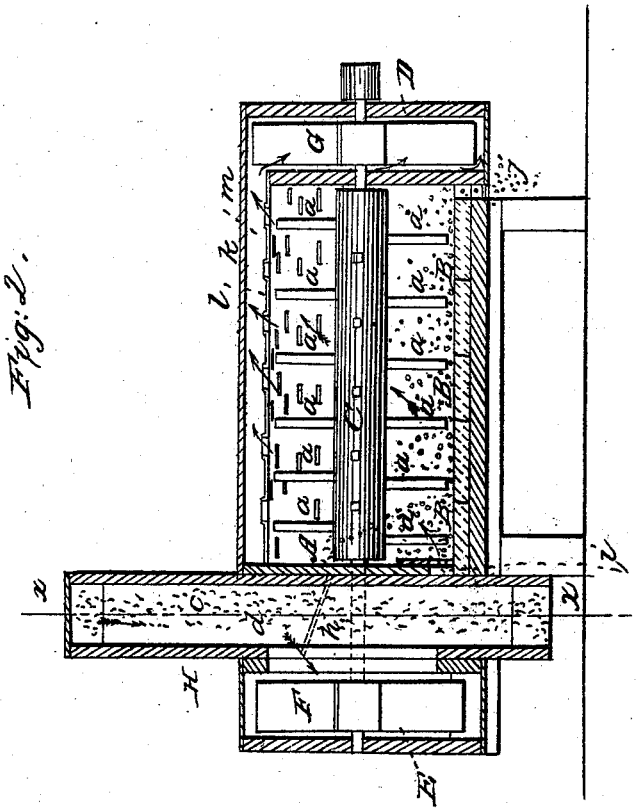
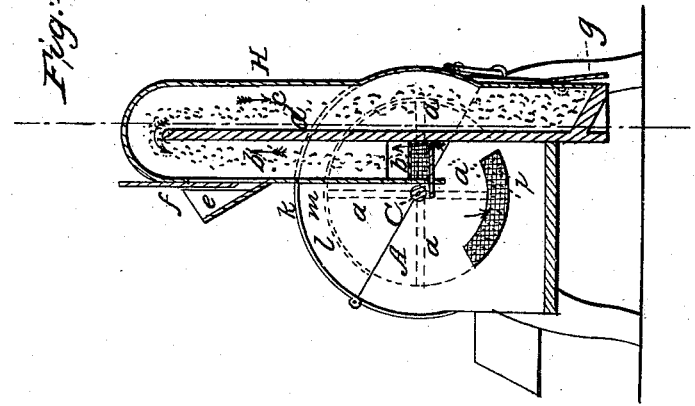

UNITED STATES PATENT OFFICE.

J. R. GATES, OF ECKMANSVILLE, OHIO.

MACHINE FOR CLEANING GRAIN.

Specification of Letters Patent No. 17,325, dated May 19, 1857.

*To all whom it may concern:*

Be it known that I, J. R. GATES, of Eckmansville, in the county of Adams and State of Ohio, have invented a new and Improved Machine for Cleaning Grain; and I do hereby declare that the following is a full, clear, and exact description of the same, reference being had to the annexed drawings, making a part of this specification, in which—

Figure 1 is a transverse vertical section (x) (x) Fig. 2 showing the plane of section. Fig. 2 is a longitudinal section of ditto, the plane of section passing through the scouring box and also through the blast spout.

Similar letters of reference indicate corresponding parts in the two figures.

My invention consists in the peculiar arrangement of a blast spout and screen used in connection with a scouring box as will be hereinafter fully shown and described whereby the smut dirt chaff and other impurities are separated from the grain in a perfect manner.

To enable those skilled in the art to fully understand and construct my invention, I will proceed to describe it.

A represents a cylindrical box in the lower part of which bur stone concaves B are fitted, said concaves extending around about one half the inner circumference of the box.

C represents a shaft which passes longitudinally through the center of the box A. This shaft has radial beaters or arms (*a*) attached to it. The shaft also extends through two fan boxes placed one at each end of the box A. One of those boxes D joins the box A; the other box E is placed a short distance from the opposite end of the box A. A fan F is placed within the box E and a fan G is placed within the box D both fans being upon the shaft C. Both fan boxes have discharge spouts connected to their lower parts.

H represents a vertical box which is fitted in the space between the scouring box A and fan box E. This box is divided vertically into two parts (*b*) (*c*) by a partition (*d*). The part (*b*) has an inclined screen (*b'*) at its lower end said screen conducting the grain into the scouring box A. A hopper (*e*) is placed at the upper end of the part (*b*) said hopper being provided with a slide (*f*) to regulate the admission of the grain into said part. The other part (*c*) has a flap or valve (*g*) at its lower end and said part communicates with the fan box E by means of an opening (*h*) as shown in Fig. 2.

The partition (*d*) does not extend quite up to the top of the box H. A passage is allowed between the upper end of the partition and the top of the box.

The end of the scouring box A adjoining the box H has an opening (*i*) made through it, said opening being covered by a screen and an opening (*j*) is made through the bottom of the box A at its opposite end.

The top of the box A is formed of two curved plates (*k*), (*l*) the inner one (*l*) being perforated so as to allow a communication between the interior of the box A and the passage (*m*), between said plates, said passage communicating with the fan box D.

The grain to be cleaned is placed into the hopper (*e*) and the slide (*f*) is adjusted so as to allow the grain to be fed into the part (*b*) of the box H in proper quantities. The grain passes down the part (*b*) and falls into the screen (*b'*) and is conducted into the box A. While the grain is passing down the part (*b*) the blast generated by the fan F draws the light matter, chaff, chess, etc. up over the top of the partition (*d*) and the light imperfect grain cockle etc. falls out at the lower end of the part (*c*) while the lighter substances are drawn into the fan box E and forced out of its discharge spout.

The sound grain that passes into the box A is effectually scoured by the beaters (*a*), and bur stones B the latter breaking the smut and thoroughly cleaning the grain therefrom. The kernels being perfectly scoured, the cleansed grain falls through the opening (*j*) and the dirt is drawn through the perforated cover (*l*) by the fan G and forced out through the discharge spout of the fan box D.

By the above improvement the grain is perfectly cleansed. The beaters and bur stones cleanse the eyes and blossom ends of the kernels perfectly. In these spots the smut lodges and adheres and machines hitherto used have failed to clean those parts.

The machine may be cheaply constructed and there are no parts liable to get out of repair.

Having thus described my invention what I claim as new and desire to secure by Letters Patent is—

The box H, divided into two compartments by the partition (*d*), the fan box E, and scouring box A, provided with the stones B, and rotating beaters (*a*), when the above parts are arranged relatively with each other as shown. It being understood that I do not claim, separately, either of the parts specified, but all the said parts when arranged and combined so as to operate conjointly as shown for the purpose set forth.

J. R. GATES.

Witnesses:
A. M. RAMSAY,
Z. WINTERS.